United States Patent [19]

Inaba et al.

[11] Patent Number: 5,158,783
[45] Date of Patent: Oct. 27, 1992

[54] CRANK DRIVEN INJECTION APPARATUS FOR INJECTION MOLDING MACHINE

[75] Inventors: Yoshiharu Inaba, Kawasaki; Koichi Nishimura, Sagamihara, both of Japan

[73] Assignee: Fanuc Ltd., Minamitsuru, Japan

[21] Appl. No.: 720,755

[22] PCT Filed: Nov. 1, 1990

[86] PCT No.: PCT/JP90/01408
§ 371 Date: Jul. 2, 1991
§ 102(e) Date: Jul. 2, 1991

[87] PCT Pub. No.: WO91/06414
PCT Pub. Date: May 16, 1991

[30] Foreign Application Priority Data
Nov. 2, 1989 [JP] Japan ................. 1-284831

[51] Int. Cl.⁵ .............................. B29C 45/77
[52] U.S. Cl. .......................... 425/145; 264/40.7; 425/170
[58] Field of Search ............... 425/145, 169, 149, 589, 425/592, 593, 451.5, 451.6, 150; 264/40.7

[56] References Cited

U.S. PATENT DOCUMENTS 4,741,685  5/1988  Inaba et al. ................. 425/145
4,758,391  7/1988  Shimizu et al. .............. 425/145

FOREIGN PATENT DOCUMENTS 37-12133   8/1962  Japan.
58-62030   4/1983  Japan.
63-307921 12/1988  Japan.

*Primary Examiner*—Tim Heitbrink
*Attorney, Agent, or Firm*—Staas & Halsey

[57] ABSTRACT

A low cost crank operated injection apparatus is capable of driving an injection screw with a desired driving force without the need of employing a high output type electric motor. The injection apparatus includes a crank mechanism for converting forward and reverse rotation of a driving shaft into reciprocating motion of an injection screw mounted on a pusher plate. The driving shaft is coupled through a reduction gearing unit to the power output shaft of a servomotor controlled by a numerical control device, and the apparatus operates, during the injection process, so as to cause the injection screw to move forwardly with a great driving force. The servomotor is rotated in such a manner that the driving shaft is driven forwardly within a predetermined rotary angular region corresponding to an operational region which does not include the dead center positions of the crank mechanism, whereby rapid changes in the injection speed and in the rate of change of injection pressure are eliminated during the operating cycle.

6 Claims, 4 Drawing Sheets

CRANK DRIVEN INJECTION APPARATUS FOR INJECTION MOLDING MACHINE

TECHNICAL FIELD

The present invention relates to a crank driven injection apparatus for an injection molding machine which employs an electric motor as its primary driver.

BACKGROUND ART

Injection molding machines generally include an injection mechanism for forcing molten resin into a mold. Conventional hydraulic injection mechanisms include a hydraulic cylinder and an injection plunger. However, it is difficult to simplify the structure of hydraulic injection mechanisms and much labor is required to maintain the hydraulic cylinders and hydraulic fluid paths. Moreover, it is difficult to precisely control the reciprocation of the injection plunger.

To obviate these difficulties, injection mechanisms using motors as primary drivers have been also developed. A typical motor-driven injection mechanism includes a ball screw/ball nut mechanism having a rotatably mounted ball screw which is coupled to the output shaft of a servomotor, and a ball nut which is threadedly engaged therewith. The ball nut is mounted in such a manner that it is unrotatable relative to but movable in unison with an injection screw. The rotary motion of the motor output shaft is converted into linear motion of the injection screw through the ball screw/ball nut mechanism, so as to drive the screw in the direction of injection. However, motor-driven ball screw/ball nut injection mechanisms are expensive.

Moreover, in such motor-driven injection mechanisms, typically, the servomotor is operatively coupled to the ball screw through the medium of a power transmission which includes respective toothed pulleys fixed on the motor output shaft and the ball screw, and a timing belt stretched between such pulleys. In this connection, the power reduction ratio between the servomotor and the ball screw cannot be increased and in order to drive the injection screw with a desired driving force, in particular, with a great driving force, a servomotor which is high in output torque is required. However, since general-purpose servomotors having high output torque are not readily available, motor-driven injection mechanisms are high-priced.

DISCLOSURE OF THE INVENTION

The object of the present invention is to provide a crank operated injection apparatus which is low-priced and which is capable of driving an injection screw with a desired driving force, without the need of employing a high output type electric motor.

In order to achieve the aforementioned object, according to the present invention, there is provided a crank operated injection apparatus for use in an injection molding machine which has an elongated injection screw disposed to be movable toward and away from the front face of a stationary plate. The screw has a longitudinal axis and the same is positioned with its longitudinal axis extending along a straight line which passes through the front face of the stationary plate. The screw is mounted for linear reciprocating movement along such line toward and away from the face of the stationary plate. The injection apparatus of the invention includes an electric motor having a rotatable output shaft and the motor is operable to rotate the output shaft in forward and reverse rotational directions. The injection apparatus also includes a reduction gearing mechanism having a rotatable drive shaft and gearing elements which operably interconnect the output shaft of the motor and the drive shaft such that the drive shaft is rotated in forward and reverse directions in coordination with the output shaft of the motor. A crank mechanism operably interconnects the drive shaft and the injection screw for converting forward and reverse rotation of the drive shaft into said reciprocating movement of the injection screw. A control unit is provided for controlling the operation of the electric motor in such a manner that the drive shaft is rotated in said forward and reverse directions within a predetermined rotary angular region corresponding to a predetermined operational region of the crank mechanism which does not contain a dead center position of the crank mechanism.

As described above, in the injection apparatus of the present invention, rotation of the output shaft of an electric motor is converted into reciprocating motion of an injection screw. Accordingly, an expensive ball screw/ball nut mechanism is not required. This makes it possible to provide a low-priced injection apparatus. Moreover, reduction gearing is interposed between the output shaft of the electric motor and a drive shaft coupled to a crank mechanism for reciprocating the injection screw so that the injection screw may be driven with a desired driving force even though the output torque of the electric motor is small. Thus, the present invention eliminates the need for a high output type electric motor, and hence the cost of the injection apparatus can be reduced. In addition, since the crank mechanism is operable within a predetermined operational range which does not contain a dead center position of the crank mechanism, the injection speed is not rapidly reduced in the initial and final stages of the injection process, and the rate at which the injection pressure changes with rotation of the driving shaft is not suddenly increased. Thus, a desired injection speed can be obtained over the entire operational range of the crank mechanism, and hence the injection process can be smoothly carried out.

BEST MODE FOR CARRYING OUT THE INVENTION

Figure 1:
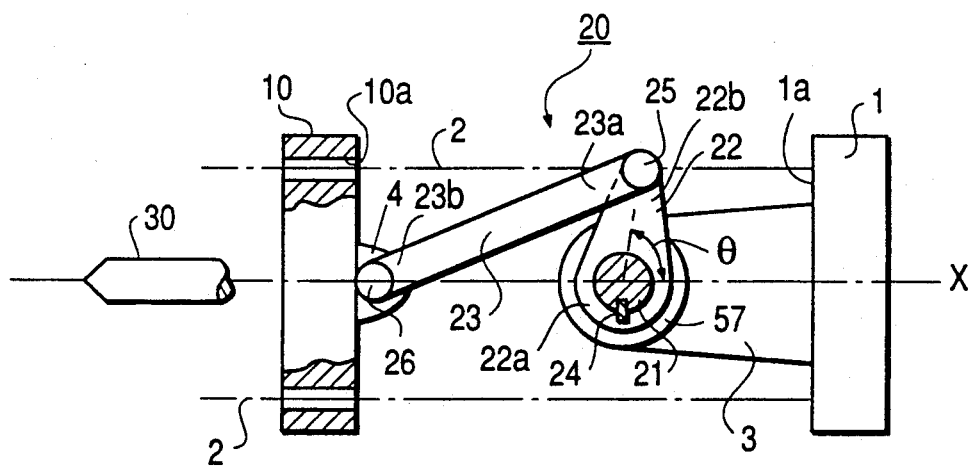
FIG. 1 is a schematic elevational view having portions partially broken away to illustrate a crank operated injection apparatus according to a first embodiment of the present invention.

An injection molding machine which includes a crank operated injection apparatus according to a first embodiment of the present invention is shown in FIG. 1. The machine includes a rear plate 1 fixed on an extruder base (not shown), a front plate (not shown), and a plurality of tie bars 2 (shown in a chain line). Each of the tie bars 2 has opposite ends which are respectively coupled to these plates.

The injection apparatus comprises a pusher plate 10 disposed for reciprocal motion along the tie bars 2 between the front plate and the rear plate 1, and a crank mechanism 20 for causing the pusher plate 10 to move toward and away from the rear plate 1. The pusher plate 10 is provided at its peripheral portions with a plurality of guide holes 10a, and the tie bars 2 are arranged to extend through the respective guide holes 10a in parallel with one another. An injection screw 30 is disposed at a front face of the pusher plate 10 so as to be movable toward and away from the front face 1a of plate 1 in unison with the pusher plate 10, and screw 30 is fitted in an injection cylinder (not shown) having a tip end provided with an injection nozzle (not shown). A first bracket 3 is fixed on the front face 1a of the rear plate 1 and a second bracket 4 is fixed on the rear face of the pusher plate 10. The brackets 3 and 4 are disposed to project along the axis X of the injection screw 30 which passes through face 1a as shown in FIG. 1.

More specifically, the crank means 20 comprises a driving shaft 21 which is rotatably supported by the first bracket 3. As described in detail hereinafter, the driving shaft 21 is comprised of first and second shaft portions 21a and 21b (FIG. 2) which are arranged for integral rotation. An elongated crank arm 22 has one of its ends 22a fixed onto driving shaft 21 for rotation therewith, and arm 22 cooperates with a connecting rod 23 to form a crank mechanism for converting the rotary motion of the driving shaft 21 into linear motion of the pusher plate 10 and the injection screw 30. End 22a of crank arm 22 is fixed on the shaft 21 by means of a key 24, and arm 22 is arranged to rotate in unison with the driving shaft 21. The connecting rod 23 is elongated and has one of its ends 23a rotatably coupled to the outer end 22b of the crank arm 22 via a crank pin 25, so that rod 23 is swingable relative to crank arm 22. Another end 23b of the connecting rod 23 is rotatably coupled to the second bracket 4 via a coupling pin 26 for swinging motion relative thereto. The driving shaft 21, the crank pin 25 and the coupling pin 26 respectively are parallel to one another, and the same extend and in a direction which is perpendicular to the screw axis X. As can be seen in FIG. 1, driving shaft 21 and coupling pin 26 are disposed on the screw axis X.

Figure 2:
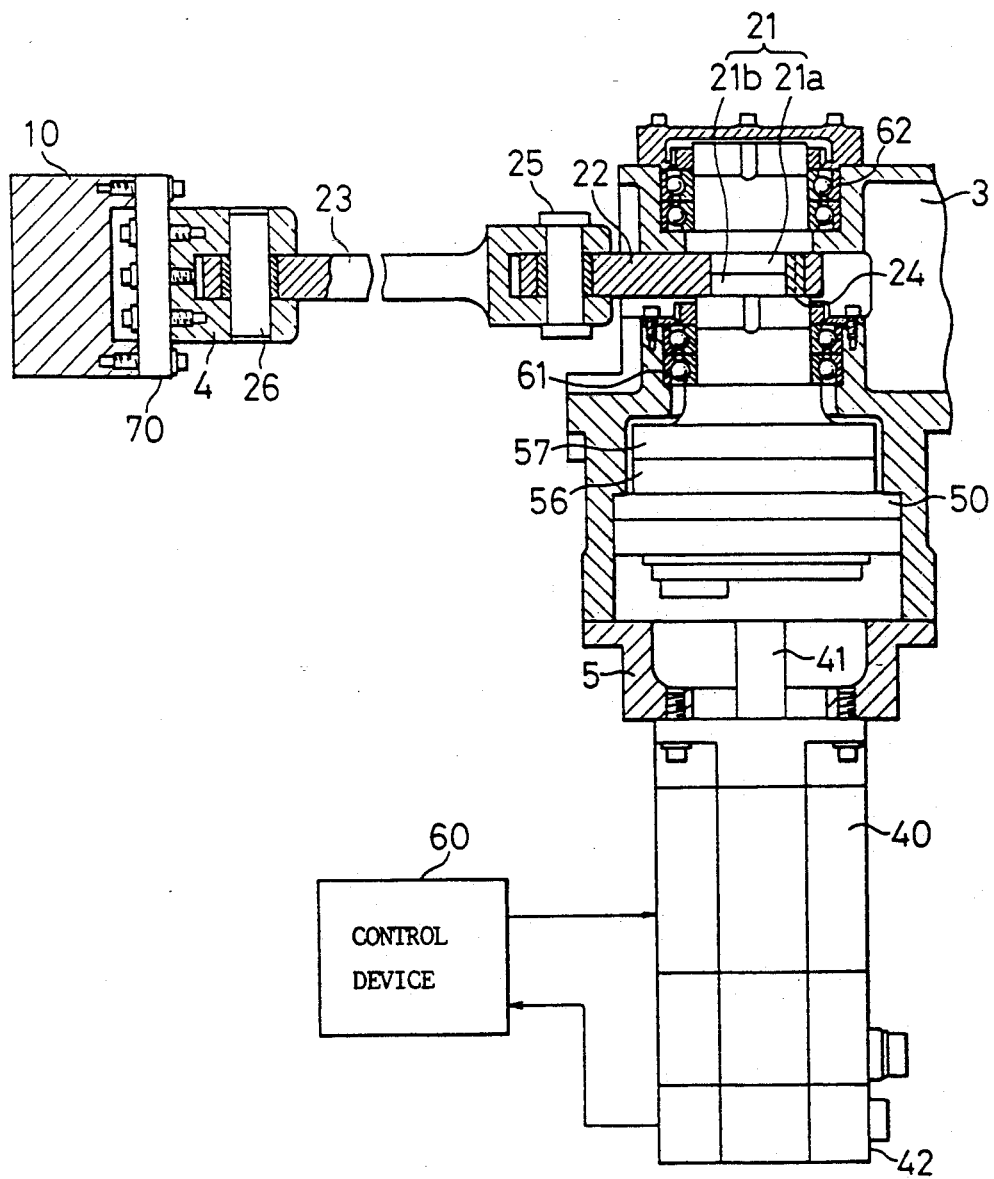
FIG. 2 is a schematic, partially cross-sectional, top plan view of the injection apparatus of FIG. 1.

As shown in FIG. 2, the crank operated injection apparatus further comprises a servomotor 40 fixed on the apparatus via a mounting member 5, a reduction gearing mechanism 50 interposed between the output shaft 41 of the servomotor 40 and the driving shaft 21 of the crank mechanism 20, for amplifying the output torque of the servomotor 40, and a control unit 60 for controlling the drive of the servomotor 40. As can be seen in FIG. 2, reduction gearing mechanism 50 is fixed to the first bracket 3. The servomotor 40 may be a general purpose servomotor other than a high output type servomotor.

Figure 3:
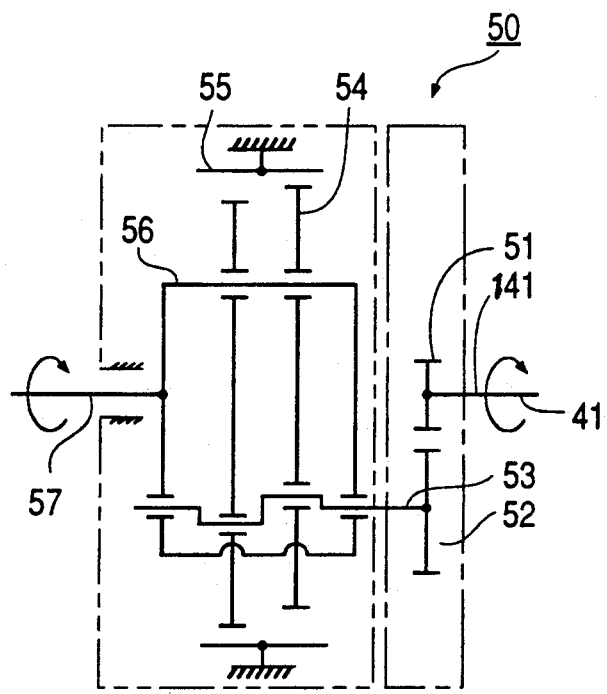
FIG. 3 is a schematic view illustrating the construction of a reduction gearing mechanism incorporated in the injection apparatus of FIG. 2.

In the present embodiment, the reduction gearing unit 50 comprises a built-in type reduction gearing unit whose reduction ratio is high, e.g., an RV reduction gearing unit as manufactured by Teijin Seiki Co., Ltd. As shown in FIG. 3, the RV reduction gearing unit 50 comprises a sun gear 51 disposed for rotation in unison with the motor output shaft 41 which is connected to gearing unit 50 by way of a power inlet shaft 141, and the mechanism is so designed that each of the three planet gears (one of them is denoted by the reference numeral 52) meshing with the sun gear 51 is caused to rotate about its own axis, upon rotation of the sun gear 51, while moving around the sun gear 51. A crank shaft 53 supported by a casing 56 for rotation in unison with the planet gear 52 supports two eccentric gears 54, and cycloid-shaped external teeth formed in each eccentric gear are meshed with a stationary ring gear 55 having inside teeth. With rotation and revolution of the crank shaft 53, the eccentric gears 54 rotate around the crank shaft 53 while moving along with the ring gear 55, and further, the casing 56 by which the crank shaft 53 is rotatably supported and an output shaft 57 arranged for rotation in unison with the casing, rotate with a large reduction ratio (1:40 in the present embodiment) with respect to the rotation of the motor output shaft 41).

Referring to FIG. 2 again, the power outlet shaft 57 of the reduction gearing unit 50 is formed integrally with the shaft portion 21b of the driving shaft 21 of the crank mechanism 20, and the same is rotatably supported by the first bracket 3 through a ball bearing assembly 61. The first shaft portion 21a of the driving shaft 21 is disposed in alignment with the second shaft portion 21b, and the same is coupled to the second shaft portion 21b for rotation in unison therewith. Shaft 21 is further rotatably supported by the first bracket 3 through a ball bearing assembly 62.

In the embodiment of FIGS. 1 and 2, the control unit for controlling the drive of the servomotor 40 is mounted on the injection molding machine, and the same is comprised of a numerical control device including a processor, a servo circuit (not shown), etc. The servo circuit is connected to the servomotor 40 and a position detector 42 is attached thereto. The numerical control device 60 is operable to control starting, stopping, speed of rotation, and direction of rotation of the servomotor 40, and further to control the extent of rotation (the total rotary angle) of the servomotor 40 in one injection process, in accordance with a control program prepared beforehand. More specifically, the extent of rotation of the servomotor 40 in one injection process is controlled in such a manner that the driving shaft 21 of the crank mechanism 20 is rotated, from the start of the injection process to the completion thereof, within a predetermined rotary angular region (e.g., the rotary angular region varying from 30° to 150°) corresponding to a predetermined operational region which excludes the upper and lower dead center positions of the crank mechanism 20 as well as positions which are near such dead center positions. Moreover, the extent of motor rotation in the metering process is controlled in a similar manner, so that the driving shaft 21 is rotated, e.g., from 150° to 30°. Here, the rotary angle of the driving shaft 21 is represented by that angle θ (shown in FIG. 1) which is formed between the axis of the crank pin 25 of the crank mechanism and the screw axis X. The rotary angle of the driving shaft assumes a value of 0° when the crank pin 25 is located on the screw axis X at the side closest to the rear plate 2 with respect to the driving shaft 21. At such time, the crank arm 22 and the connecting rod 23 are overlapped with each other, and their axes are aligned with the screw axis X.

In FIG. 2, reference numeral 70 denotes a load cell held between the pusher plate 10 and the second bracket, for detecting the reaction force (injection pressure, back pressure) of molten resin acting on the injection screw 30. The numerical control device 60 is so designed as to execute injection pressure and back pressure control in accordance with output of the load cell, where required. However, such control is not carried out in this embodiment.

The operation of the injection apparatus shown in FIGS. 1 and 2 is as follows.

When the processor of the numerical control device 60 starts pulse distribution to the servo circuit after injection start command, the direction of rotation and target rotational speed of the servomotor 40, and the target extent of rotation of the servomotor 40 over the time period from the start of injection to the completion thereof are read by the process from the control program, and the drive for the forward rotation of the servomotor 40 is started by the servo circuit. The forward rotary force of the servomotor 40 is amplified by the reduction gearing unit 50, and such force is then transmitted to the driving shaft 21 of the crank mechanism 20. As a result, the driving shaft 21 is rotated in the forward direction from its initial rotary angular position of 30° with a great driving force and at a predetermined speed. By the forward rotation of the driving shaft 21, the pusher plate 10 and the injection screw 30 arranged integrally therewith are driven in the forward direction with a great driving force, through the key 24, crank arm 22, crank pin 25, connecting rod 23, and coupling pin 26 of the crank mechanism 20 and through the second bracket 4, so that the molten resin within the injection cylinder is injected into a mold.

During the injection process, the pulse distribution from the processor to the servo circuit is periodically executed, while feedback pulses from the position detector 42 are supplied to the servo circuit with rotation of the servomotor 40, and any deviation between the current target rotational position of the motor and its actual rotational position is stored in an error resistor of the servo circuit. Thereafter, when a final target rotational position is reached or when the rotary angle of the driving shaft 21 reaches 150°, the rotation of the servomotor 40 is stopped, whereby the injection process is completed. Then, a holding process is initiated.

Figure 4:
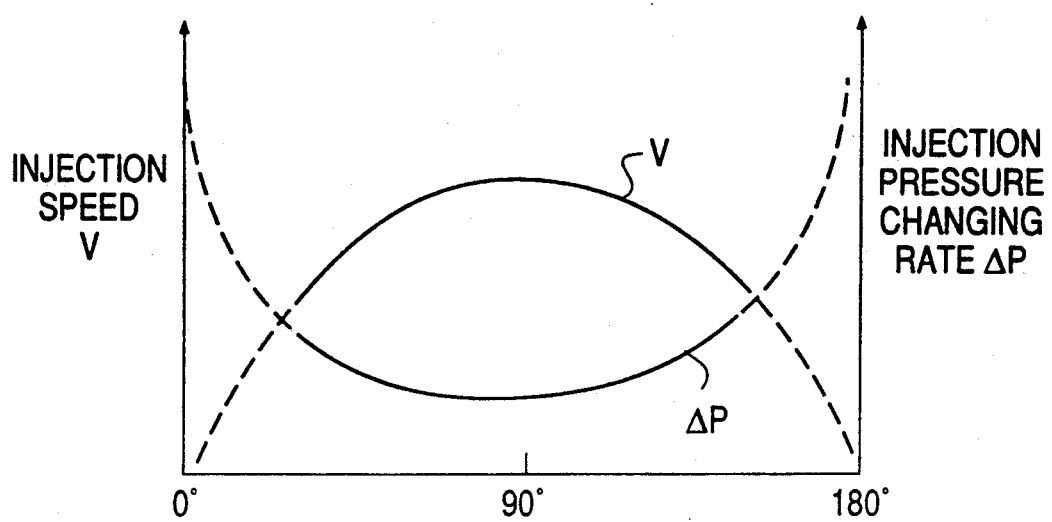
FIG. 4 is a graph illustrating the rate of change of injection speed and injection pressure as a function of the rotary angle of the driving shaft of the crank mechanism included in the apparatus of FIGS. 1-3.

As explained above, during the injection process, the driving shaft 21 of the crank mechanism 20 is driven by the servomotor 40 through the reduction gearing unit 50 so as to rotate forwardly. This makes it possible to drive the injection screw 30 in the forward direction with a desired driving force against the reaction force generated by the molten resin via the crank mechanism and pusher plate 10, even if the servomotor consists of a general purpose servomotor. Furthermore, during the injection process, the driving shaft 21 is rotated within the rotary angular region varying from 30° to 150°, corresponding to an operational region which does not include either of the upper and lower dead center positions of the crank mechanism 20 or positions which are in the vicinity of the dead center positions. As a result, rapid decreases (shown by the dotted line in FIG. 4) in the injection speed (speed of forward movement of the pusher plate and the screw) accompanying changes in the rotary angle of the driving shaft 21, and rapid changes (shown by the dotted line in FIG. 4) in the rate of change of the injection pressure (driving force applied from the crank mechanism to the pusher plate and the injection screw) are eliminated since such rapid decreases and rapid changes occur only in rotary angular regions corresponding to the upper and lower dead center positions. In comparison with a case where the driving shaft 21 is rotated in a rotary angular region varying from 0° to 180°, in accordance with the present invention, the injection speed V is maintained at a larger value within the rotary angular region of the driving shaft. Furthermore, the rate of change $\Delta P$ of the injection pressure changes relatively gradually as shown by the solid line in FIG. 4, with a change in the rotary angle of the driving shaft. As a result, the injection process by the crank operated injection apparatus of the invention is speedily and smoothly accomplished. In the meantime, FIG. 4 shows the injection speed V and the changing rate $\Delta P$ of the injection pressure when the driving shaft 21 rotates at a constant speed. If necessary, the extent of rotation of the driving shaft can be variably controlled.

When the metering process starting command is read out from the control program after completion of cooling, mold-opening, product-ejecting and mold-closing processes following the hold process, the driving shaft 21 is rotated in a reverse direction from the rotary angular position of 150° toward the rotary angular position of 30° by the servomotor 40 under the control of the processor. Thus, the injection screw 30 and the pusher plate 10 are moved back to their initial positions to await the next injection process.

Figure 5:
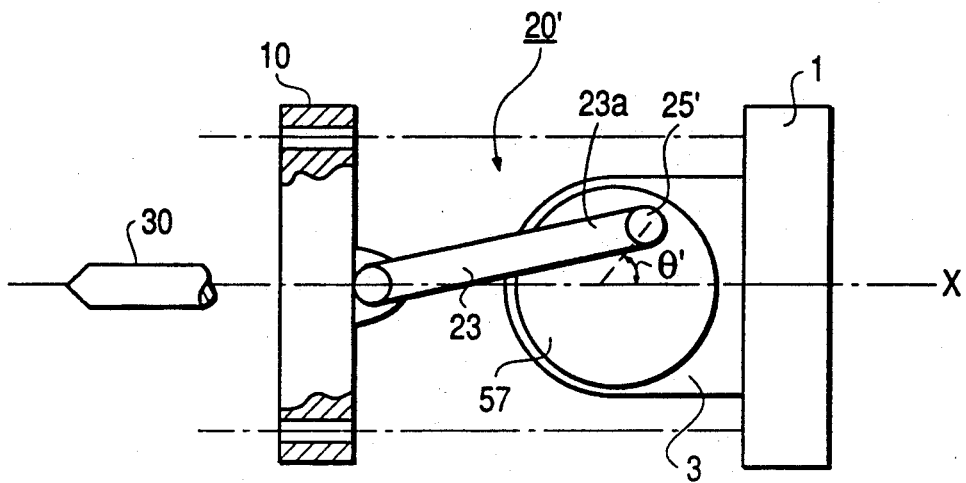
FIG. 5 is a schematic elevational view similar to FIG. 1 to illustrate a crank operated injection apparatus according to a second embodiment of the present invention.
Figure 6:
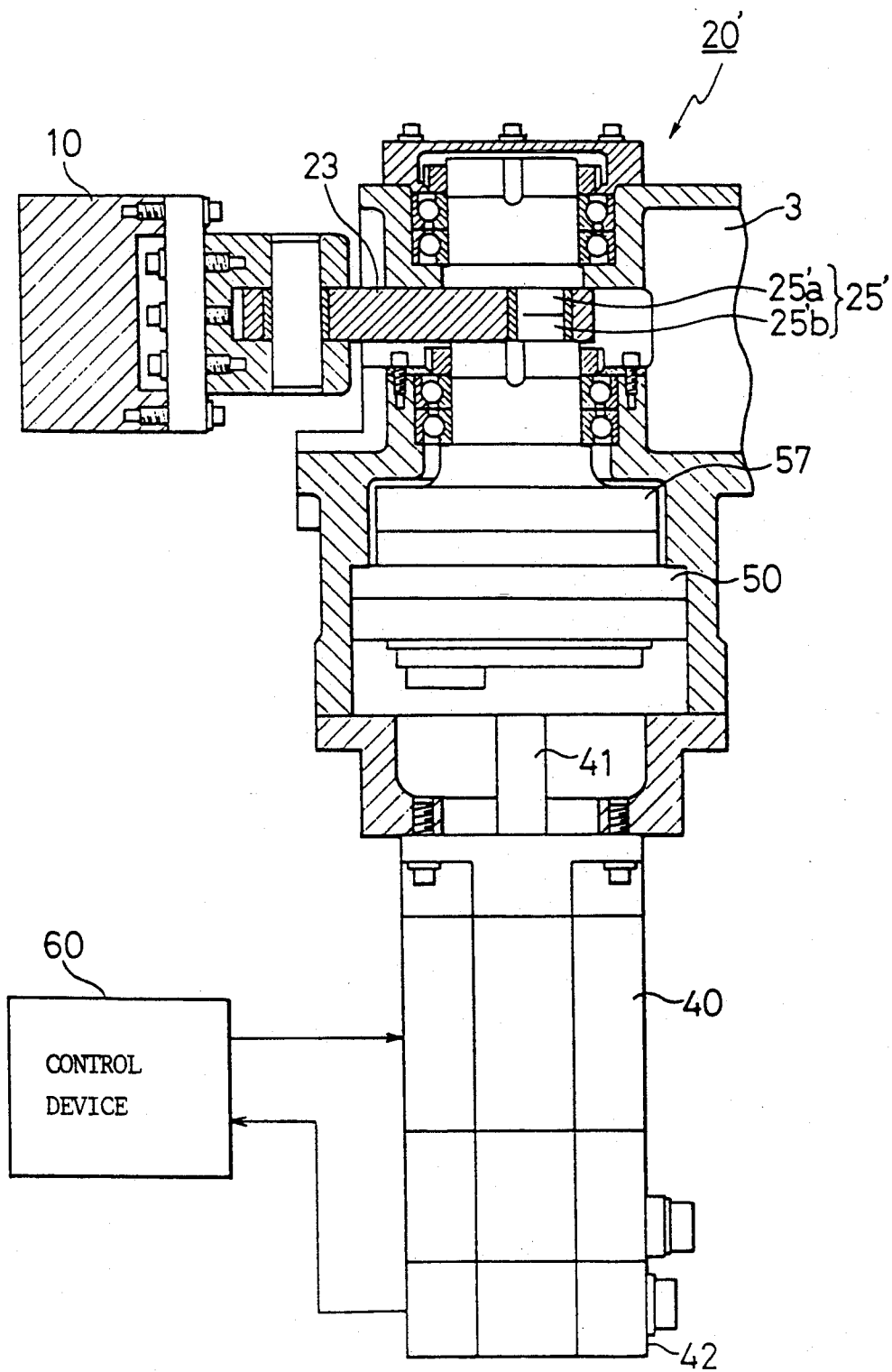
FIG. 6 is a schematic, partially cross-sectional, top plan view of the injection apparatus shown in FIG. 5.

Next, with reference to FIGS. 5 and 6, a crank operated injection apparatus of a second embodiment of the present invention will be described. In FIGS. 5 and 6, elements which are in common with elements of the first embodiment are shown using like reference numerals, and description thereof will be omitted.

In the injection apparatus of the second embodiment, the driving shaft 21, the crank arm 22, and the key 24 of the first embodiment are eliminated, and the connecting rod 23 instead has its end 23a coupled to the output shaft 57 of the reduction gearing unit 50 via a crank pin 25'. The crank pin 25', which is comprised of two halves 25'a and 25'b which are coupled together for integral rotation, is disposed in a noncentric position with respect to the axis of rotation of the output shaft 57, and the same cooperates with the connecting rod 23 and related components to form a crank mechanism 20'. The output shaft 57 of the reduction gearing 50 functions as a driving shaft for the crank mechanism 20'. If the radial distance of the crank pin 25' from the axis of rotation of the output shaft 57 is equal to the pin-to-pin length of the crank arm 22 of the first embodiment, the stroke of the pusher plate 10 is the same in both the embodiments. Similarly to the first embodiment, the rotary angle of the driving shaft 57 is limited within a region varying from 30° to 150°. The rotary angle of the driving shaft is represented by an angle $\theta$ formed between the straight line, which connects the center of the crank pin 25' with that of the driving shaft 57, and the screw axis X. This rotary angle assumes a value of 0° when the crank pin 25' is positioned on the screw axis X at the side closest to the rear plate 1.

In the injection apparatus of FIGS. 5 and 6, since the embodiments 21, 22 and 24 of the first embodiment are unnecessary, the number of components is reduced so that the construction of the crank mechanism 20' is simplified, and the same has greater durability. Because the stroke of the pusher plate 10 is limited to a value smaller than the diameter of the output shaft 57 of the reduction gearing 50, the injection apparatus is suitable for small-sized injection molding machines.

The present invention is not limited to the aforementioned first and second embodiments, and various modifications thereof may be made.

For example, although an RV reduction gearing unit is employed as the reduction gearing unit 50 in the foregoing embodiments, other reduction gearing units may be employed. Especially, a cyclonic reduction gearing unit (manufactured by Sumitomo jukogyo Co., Ltd.) provides a high reduction ratio in the order of 1:200 in a single reduction stage, as in the RV reduction gearing unit, and the cyclonic unit also can be easily built into the power transmission path between the motor and the crank mechanism. Therefore, the cyclonic gearing unit is preferable for use as a built-in type reduction gearing unit with a high reduction ratio. Further, the rotary angular region of the driving shafts 21 and 57 is not always limited within a region of 30° to 150°, and the rotary angular region may be determined appropriately in dependence on the specifications of the injection molding machine concerned. Moreover, although the driving shaft 21 and the crank pin 25' each are shown as being made up of two component parts in the first and the second embodiments, drive shafts and crank pins made up of a single part may be also employed.

In the second embodiment, the connecting rod 23 is coupled through the crank pin 25' to the output shaft 57 of the reduction gearing unit 50 which serves as the driving shaft. Alternatively, the connecting rod may be coupled to a disc fixed to the output shaft of the reduction gearing unit, whereby the stroke of the pusher plate 10 can be increased.

We claim:

1. Injection apparatus for an injection molding machine, said apparatus including a stationary plate having a front face, said apparatus comprising:
    an elongated injection screw having a longitudinal axis, said screw being positioned with its longitudinal axis extending along a straight line which passes through said front face of the stationary plate, said injection screw being mounted for linear reciprocating movement toward and away from said face along said line;
    an electric motor having a rotatable output shaft, said motor being operable to rotate said output shaft in forward and reverse rotational directions;
    a reduction gearing mechanism including a rotatable drive shaft and gearing elements operably interconnecting said output shaft and said drive shaft such that the drive shaft is rotated in forward and reverse rotational directional in coordination with said output shaft;
    a crank mechanism operably interconnecting said drive shaft and said injection screw for converting forward and reverse rotation of the drive shaft into said linear reciprocating movement of the injection screw; and
    a central unit for controlling the operation of the motor in such a manner that the drive shaft is rotated in said forward and reverse directions within a predetermined rotary angular region corresponding to a predetermined operational region of the crank mechanism which does not contain a dead center position.

2. An injection apparatus as set forth in claim 1, wherein said apparatus includes a pusher plate mounted for movement toward and away from the stationary plate, said screw being mounted on said pusher plate for movement in unison therewith, said crank mechanism being operably coupled to the screw through said pusher plate.

3. An injection apparatus as set forth in claim 2, wherein said crank mechanism includes an elongated crank arm having one end coupled to the drive shaft, an elongated connecting rod having one end rotatably coupled to the pusher plate, and a crank pin rotatably coupling another end of the crank arm to another end of the connecting pin.

4. An injection apparatus as set forth in claim 3, wherein said crank mechanism includes a bracket attached to the pusher plate and a coupling pin rotatably coupling said one end of the connecting rod to said bracket.

5. An injection apparatus as set forth in claim 1, wherein said reduction gearing mechanism includes power inlet and power outlet shafts, said power outlet shaft being connected to said drive shaft in operating alignment therewith, said power inlet shaft being directly coupled to said output shaft.

6. An injection apparatus as set forth in claim 2, wherein said crank mechanism includes a crank pin mounted on said drive shaft in a non-centric position relative to the axis of rotation of the drive shaft, and an elongated connecting rod having one end rotatably coupled to said crank pin and another end rotatably coupled to said pusher plate.

* * * * *

UNITED STATES PATENT AND TRADEMARK OFFICE
CERTIFICATE OF CORRECTION

PATENT NO. : 5,158,783
DATED : October 27, 1992
INVENTOR(S) : YOSHIHARU INABA and KOICHI NISHIMURA It is certified that error appears in the above-identified patent and that said Letters Patent is hereby corrected as shown below:

Column 8, line 32, "pin" should be --rod--.

Signed and Sealed this

Twelfth Day of October, 1993

Attest:

BRUCE LEHMAN

*Attesting Officer*     *Commissioner of Patents and Trademarks*